United States Patent [19]
Matlen

[11] 3,882,766
[45] May 13, 1975

[54] AUTOMATIC OVEN

[76] Inventor: Abraham J. Matlen, 15347 Lauder, Detroit, Mich. 48227

[22] Filed: Oct. 15, 1973

[21] Appl. No.: 406,157

[52] U.S. Cl. ............... 99/327; 126/25 AA; 99/347; 99/391; 99/393; 99/402; 99/427; 99/443 R
[51] Int. Cl. ........................ A47j 37/04; A47j 27/62
[58] Field of Search ............ 99/327, 345, 347, 391, 99/393, 395, 396, 397, 443 R, 326, 400, 402, 427; 126/25 A, 25 AA; 312/312, 266, 299; 187/94; 254/178

[56] References Cited
UNITED STATES PATENTS

| | | | |
|---|---|---|---|
| 995,270 | 6/1911 | McCaughey | 99/402 |
| 2,573,115 | 10/1951 | Sisto | 99/443 R |
| 2,689,517 | 9/1954 | Angelus | 99/345 |
| 2,915,959 | 12/1959 | Stott | 99/345 |
| 3,333,529 | 8/1967 | Wilson | 99/427 |

Primary Examiner—Harvey C. Hornsby
Assistant Examiner—James A. Niegowski

[57] ABSTRACT

An oven for automatically broiling and self-basting foods including an upper cooking station for cooking foods between opposed electrical heating members, a lower rest station, a rotatable food retainer, and a drive system for continuously rotating the food retainer for self-basting of the food in its own juices and for selectively raising and lowering the food retainer between the cooking station and the rest station. The drive includes a single chain operably rotating the food retainer and engaging a slidable counterbalance with the movement of the counterbalance transmitted by the chain to raise and lower the food retainer. The food retainer includes a flat circular disk pivotally connected to a flat circular plate which has peripheral radially outwardly extending teeth. The teeth engage a drive mounted to rotate with a sprocket which, in turn, is driven by the chain. Both the plate and disk are formed as a lateral grid work of ribs with open spaces therebetween; the food is retained by spikes attached to the ribs of the disk, and the spaces between the grid expose the food to the heating elements.

5 Claims, 7 Drawing Figures 3,882,766

AUTOMATIC OVEN

BACKGROUND OF THE INVENTION

One type of conventional food broiling oven in commercial and industrial use provides an overhead heating unit for cooking one side of the food at a time. Typically, juices from the food drip downward and are wasted.

Another type of conventional broiling oven provides for heating from underneath the food with the juices dropping onto the heating elements themselves causing occassional fires and again causing a waste of the natural juices of the food.

Yet a third type has vertically opposed heating elements with the food cooked therebetween, however the cooking tends to be uneven and cooking control is poor if not impossible.

In the above-described ovens, three types of problems are apparent. First, the food must be turned manually, in order to broil "both sides" (except in the vertical-opposed heater type). Second, the food must be manually removed from the "fire" when broiled to the desired degree of completion, otherwise the food will be "overdone". This requires constant attention by a cook. Third, the natural juices are wasted; they may drip onto heating elements causing a fire, and the food being broiled tends to dry out rather than remain moist.

With the presently available cooking equipment, in addition to the above problems, a one inch thick steak must be broiled for approximately 12 minutes to be cooked "rare" and oftentimes as much as 22 minutes to be cooked "well-done".

Hence the invention herein relates to an improvement in ovens including a reduction in cooking time, an oven for cooking both sides of the food and for automatically removing the food from the cooking area when it is properly done, and an oven for utilizing the natural juices of the food during the cooking operation.

SUMMARY OF THE INVENTION

The invention herein relates to an oven for automatically cooking, such as broiling, and self-basting the food. The oven includes a frame having an upper cooking station for broiling foods between two opposed electrical heating means, and a lower rest station into which the food is automatically removed from the cooking area when "done". A rotatable retainer holds the food which is be cooked, and dual drive means are provided for continuously rotating the retainer whereby juices from the food being cooked self-baste the food during cooking. The dual drive means further selectively raises and lowers the retainer between the cooking station and the rest station.

The dual drive means of the present invention includes a single closed-loop chain which operatively engages both the rotatable food retainer and a counterbalance which is slidably mounted in the support frame. The chain is driven by a motor to rotate the food retainer and, when the counterbalance is vertically moved within the support frame, the effective length of the chain between the counterbalance and the food retainer is changed to thereby raise or lower the food retainer into or out of the cooking area.

The food retainer includes a first circular plate having radially outwardly extending teeth around its periphery to operatively engage the chain via a driver or drive gear to rotate with a sprocket which, in turn, is rotated by the chain. The retainer also includes an annular disk pivotally connected to the plate by a hinge. Both the disk and the plate have a lateral gridwork or ribs with spaces therebetween and the food may be held on spikes attached to the ribs on the disk with sufficient portions of the food exposed to the heating means through the spaces for proper cooking. The disk includes a hook to engage a stud on the plate so that the plate and disk may be locked together, thereby securely retaining the food.

The automatic oven has a series of preselected timing cycles to vary the duration of cooking based upon the number of pieces of food placed in the retainer at a given time, the type of food, and also the desired degree of "doneness". A digital readout may also be provided so that the operator of the oven will know how much longer the food will remain in the cooking area.

For the purpose of industrial application, of course, several automatic ovens may be placed next to each other for operation by a single attendant.

BRIEF DESCRIPTION OF THE DRAWINGS

The foregoing features of the present invention, together with other advantages which may be attained by its use, will become apparent upon reading the following detailed description taken in conjunction with the drawings.

In the drawings, wherein like references numerals identify corresponding parts.

DETAILED DESCRIPTION OF THE INVENTION

Figure 1:
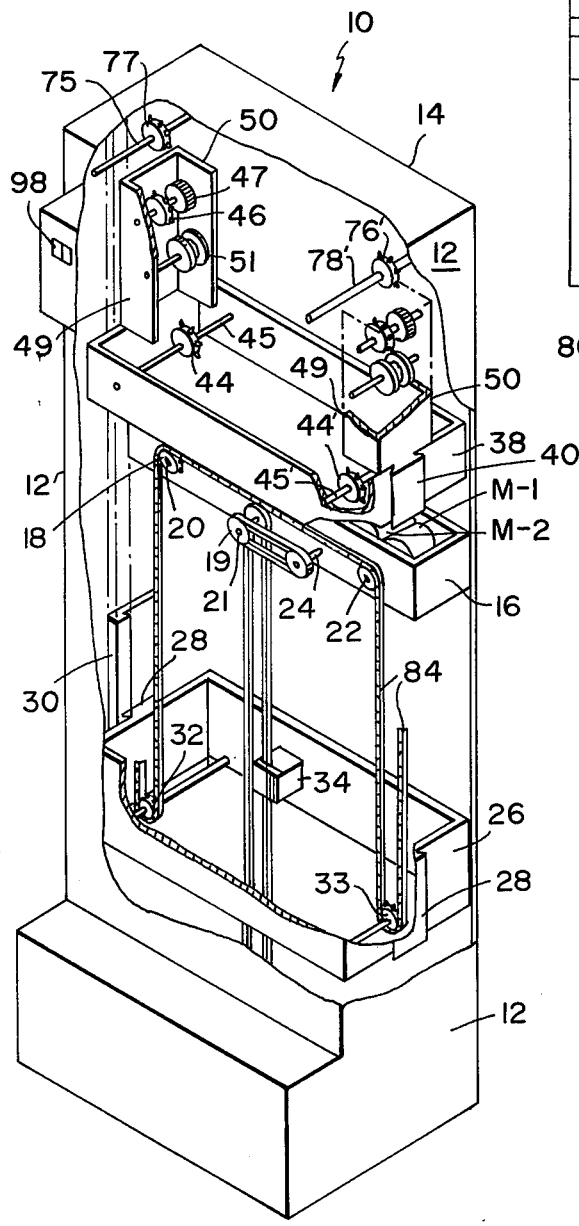
FIG. 1 is perspective illustration, partly broken away, of the automatic oven of the present invention with some elements removed for clarity.

With reference to the drawings, the automatic oven 10 of the present invention includes an upright support frame having side walls 12, a rear wall 14, and a support block 16 rigidly secured interiorly of the side walls of the frame intermediate the top and bottom thereof.

The front of the support block 16 has a forwardly projecting sprockets 18 and 19 journaled therein on suitable shafts 20 and 21. Mounted within the support block are two motors, M-1 and M-2, having drive shafts 22 and 24, respectively, which project through the block 16. The axes of rotation for the rollers and motor shafts are parallel to the side walls and horizontal.

The oven includes a counterbalance 26 which is slidably mounted such as by tongue and groove means for vertical movement within the oven frame. The sides of the counterbalance may include dove-tailed projections 28, adapted to engage dove-tailed longitudinal grooves or channels 30 in the side walls 12 of the oven frame, Alternatively, the sides of the counterbalance may include a ball with a hollow bushing therein which is mounted to slide on a vertical shaft secured to the side walls 12.

The counterbalance is positioned for vertical movement within the bottom one-third of the oven and always remains below the stationary support block 16. The counterbalance has rollers 32 and 33 at opposite sides thereof and a retaining bracket 34 intermediate the rollers. An idler pulley 36 is mounted by a permanent bracket 37 to the bottom of the oven 10 and is vertically aligned below sprocket 19.

A food tray or basket 38 is slidably mounted for vertical movement within the oven frame. For example, the sides of the tray may have dovetailed projections 40 adapted to engage the longitudinal channels 30 in the side walls 12 of the oven frame. Again, as an alternative, a ball and bushing may be mounted to slide on a shaft. The food tray is positioned to slide within the top portion of the oven for vertical movement above the support block 16.

The food tray supports two sprockets 44, 44' on suitable shafts 45, 45' at the opposite interior ends of the tray, and also supports a pair of toothed drive sprockets 46, 46' each mounted to rotate with drive gear 47, 47' on common shaft 48, 48' respectively. The sprocket-drive gear combination is in the same vertical plane as sprockets 44, 44'. All four shafts have their axes horizontal and parallel to side walls 12. Each side of the food tray extends vertically upward in the form of two rails 49, 50 to support a food retainer in a vertical plane therebetween. The rails also support idler rollers 51, 51' which are below and in the same vertical plane as the sprockets 44, 45'.

A novel food retainer 52 according to the present invention includes a flat circular plate 54 having radially outwardly extending outer peripheral teeth 56. Pivotally connected to the plate, such as by hinge 58, is a flat circular disk 60. Both plate 54 and disk 60 are formed as a lateral gridwork of ribs 61 with open spaces 62 therebetween. The plate and disk may be locked together with hooks 64 on the disk engaging studes 66 on the plate with a standoff between the hooks at act as a positive lock. Two hooks and studs are preferred, to provide a three point connection (i.e., two hooks and the hinge) between the plate and disk, although one or more hook and stud combinations may be used. Spikes 67 on the ribs of the disk 60 hold the food and the open spaces 62 expose the food to the heat of the oven.

According to the principles of the present invention, a dual drive means is provided for continuously rotating the food retainer and for raising and lowering the food retainer between an upper cooking station 70, interiorly of two opposed heating means 72 such as infrared heaters, to a lower rest station adjacent to and vertically above the support block 16.

The dual drive means includes the counterbalance, support block, basket and their associated rollers, sprockets and idlers and their respective shafts and the motors previously explained and, in addition, sprockets 75, 76 mounted on shafts 77 and 78 at opposite upper edges of the side wall 12, with the shaft axes being parallel to the side walls 12 and horizontally positioned.

Furthermore, the dual drive means also includes a first drive belt 80, operably coupling drive shaft 24 of motor M-2 to roller 19, and a second drive belt 82 operably coupling roller 19 to roller or pulley 36 on the floor.

In addition, the dual drive means includes a single chain 84 which follows a closed-loop path. Starting at the drive shaft 22 of motor M-1 and following a clockwise path, this chain 84 extends laterally across the support block 16, over sprocket 18 and downwardly, over roller or wheel 32 and then upwardly the height of the oven, over sprocket roller 75, downwardly over drive sprocket 46, laterally outwardly over roller 51 and downwardly around roller 44. From there the chain continues laterally across the food basket 38, around roller 44', upwardly around idler 51', inwardly and around drive sprocket 46', upwardly and around sprocket 76, downwardly the length of the oven and around the drive roller 33 and back upwardly to the starting point at the motor shaft 22.

The retainer is placed between and supported by the rails 49, 50 of the basket 38 over the drive wheels 44 and 44', with the retainer engaging the toothed drivers 47, 47'.

In operation, the attendant depresses a program button 86 on the front of the oven. The particular button corresponds to one of several preselected cooking cycles of a timer 88.

Once a button 86 is selected, motor M-1 is turned on to activate the dual drive means and chain 84 rotates the food retainer 52.

The chain 84 includes within its loop the roller 18 on the support block 16, the food tray or basket 38, the food retainer 52 and the counterbalance 26. Since the support block is stationary, the effective length of the chain above the support block, and thus the vertical position of both the food retainer and food basket, may be varied by raising or lowering the counterbalance 26.

The timer 88 controls motor M-2 which, through drive belts 80 and 82, lowers the counterbalance 26 to raise the food retainer into the cooking station by reducing the effective length of the chain above the support block 16. With the food retainer in this position, the food may be cooked and, since the food retainer is constantly rotating because of motor M-1, the natural juices of the food self-baste the food. Since some minimal amount of food juices and/or food particles may fall off the food, the basket 38 functions as a receptacle as well as a support for the rollers and food retainer.

Once the food is properly cooked according to the timer, reverse operation of the motor M-2 serves to raise the counterbalance 26 and thereby increase the effective length of the chain so that the food retainer 52 and its associated basket are lowered from the cooking station to the rest station.

All the while that the effective length of the chain is being adjusted by movement of the counterbalance 26, the chain continues to be driven by motor M-1 to continuously rotate the food retainer 52. At the completion of the cooking, the food retainer is being lowered to the rest station, the control program causes the food retainer to be indexed, i.e., rotated to a predetermined position with the hinge 58 at the bottom of the retainer, so that the retainer may be opened and food removed.

Means are provided to increase the efficiency of operation of this oven by a high powered accurate heater. Specifically, the heater of the present invention includes two opposed heating elements 72 which are controllable and programmable in one degree increments to a temperature in excess of 2,000°F. This temperature control is based upon the principles described in the copending patent application of myself and David Orosy entitled "Temperature Regulation for Electrical heaters", filed on Oct. 17, 1972 and assigned Ser. No. 298,294 now U.S. Pat. No. 3,789,190. Such temperature regulation together with the self-baste technique permits 1 inch steak to now be done "rare" in 3.5 minutes as contrasted to the 12 minutes necessary by prior ovens.

Doneness is defined by the amount of shrinkage of the food from the raw to the broiled state. As an illustration, a rare steak would shrink as little as 5 per cent, a medium steak around 10 per cent, and a well done steak 21 to 23 per cent. According to the present invention, shrinkage can be controlled to within one per cent, whereas the conventional oven may cause shrinkage of a well done steak to exceed 45 per cent.

Figure 2:
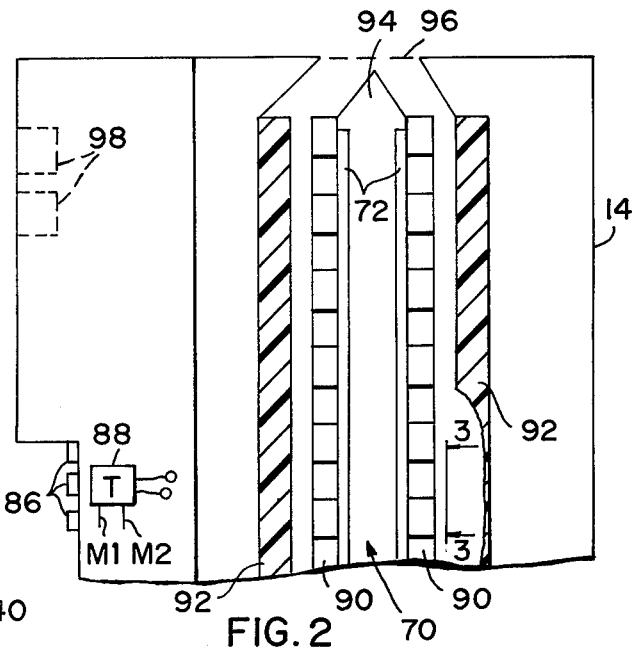
FIG. 2 is a partial side elevation view of the interior of the oven.
Figure 3:
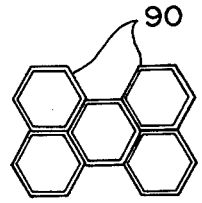
FIG. 3 is a view as seen in the direction of arrows 3—3 of FIG. 2.
Figure 4:
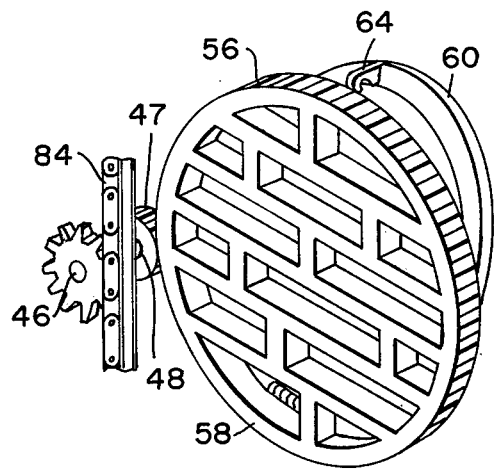
FIG. 4 is an enlarged illustration of the chain drive rotating the food retainer.
Figure 5:
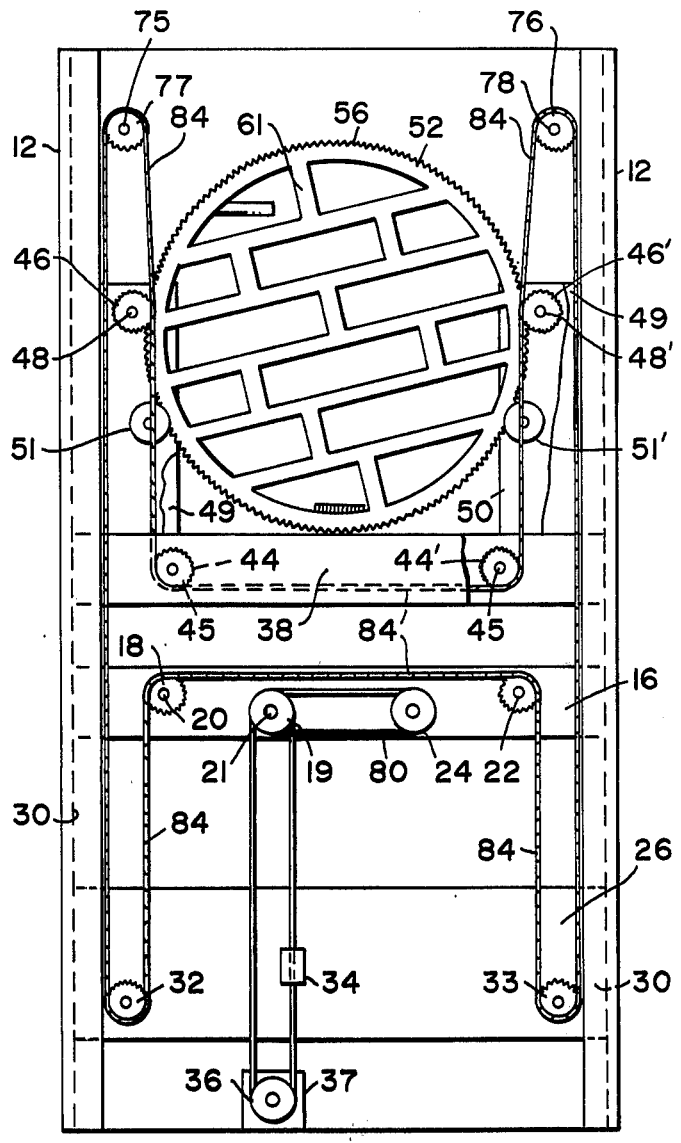
FIG. 5 is a schematic front elevation.
Figure 6:
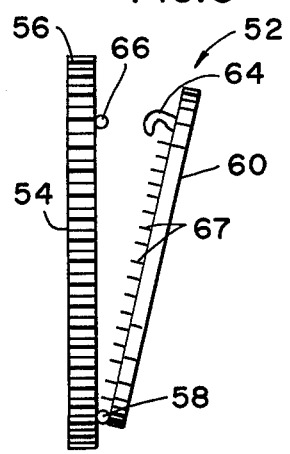
FIG. 6 is a side view of the food retainer of the present invention.
Figure 7:
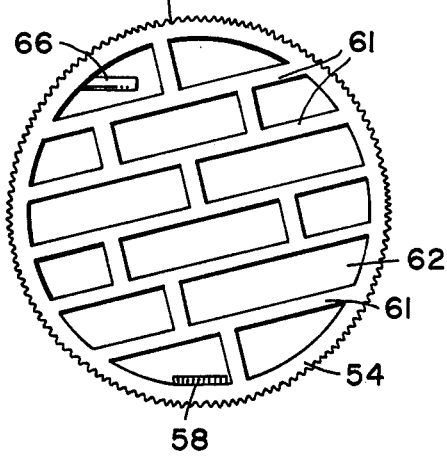
FIG. 7 is a front view of the food retainer of the present invention.

Yet another important factor of the present invention is the reduction of smoke, i.e., a "smokeless" oven. With reference to FIGS. 2 and 3, the cooking station 70, in addition to the opposed heating elements 72, includes opposed honeycomb matrices 90, which may be of aluminum oxide, positioned between opposed insulated doors 92 which are always shut except during maintainance operations. The dome 94 over the cooking station restricts the flow of smoke so that all smoke is filtered through the honeycomb and leaves the oven through a single vent 96. Thus smoke does not enter the kitchen or annoy the operator of the oven.

A digital readout 98 is provided which may count down the remaining time for the food to be cooked. In this manner, the attendant may operate several automatic ovens at the same time. A satisfactory readout using light emitting diodes is manufactured by Datel Systems Incorporated of Canton, Mass.

The foregoing is a description of the preferred embodiment of the present invention and should not be taken in a restrictive sense but only as describing the underlying concepts of the present invention. Many modifications may be made without departing from the spirit and scope of my invention. Therefore, my invention should be limited only the following claims:

What is claimed is:

1. In an oven for automatically broiling and selfbasting foods including a support frame, an upper cooking station and a lower rest station both within the frame, said upper cooking station including opposed electrically operated heating means adapted to receive the food therebetween, the improvement comprising:
   a rotatable food retainer; and
   dual drive means including a closed-loop chain for operably engaging and continuously rotating said food retainer whereby the juice from the food being cooked therein self-bastes the food and only minimal amounts of juice are wasted;
   said dual drive means further including a counterbalance slidably mounted in said support frame and said chain further operably engages said counterbalance for selectively raising and lowering said food retainer between said cooking station and said rest station, whereby the sliding movement of said counterbalance regulates the effective length of said chain between a reference level and said food retainer thereby raising and lowering said food retainer, and whereby the food, when properly cooked, is lowered to said rest station.

2. The invention as defined in claim 1, wherein said oven includes timing means for regulating the duration of cooking and for controlling said dual drive means.

3. The invention as defined in claim 1, wherein said dual drive means further includes a tray slidably mounted in said support frame, said tray including drive wheels for maintaining said chain in operative engagement with said food retainer.

4. The invention as defined in claim 1, wherein said food retainer includes a flat circular plate having radially outwardly extending peripheral teeth, and a flat circular disk pivotally connected to said plate; said plate and disk each having a lateral gridwork or ribs, certain of the ribs having spikes thereon to retain food, and said plate and disk having spaces in the gridwork to expose the food to the heating means.

5. The invention as defined in claim 1, wherein the upper cooking station further includes a honeycomb matrix enteriorly of said heating means to direct the smoke away from the food and toward an outlet vent.

* * * * *